US008588421B2

(12) United States Patent
Acar et al.

(10) Patent No.: US 8,588,421 B2
(45) Date of Patent: Nov. 19, 2013

(54) CRYPTOGRAPHIC KEY CONTAINERS ON A USB TOKEN

(75) Inventors: Tolga Acar, Sammamish, WA (US); Carl M. Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1359 days.

(21) Appl. No.: 11/627,466

(22) Filed: Jan. 26, 2007

(65) Prior Publication Data

US 2008/0181412 A1 Jul. 31, 2008

(51) Int. Cl.
G06F 21/00 (2013.01)
(52) U.S. Cl.
USPC .......................................... 380/277; 380/278
(58) Field of Classification Search
USPC .................................................. 380/277, 278
See application file for complete search history.

(56) References Cited

U.S. PATENT DOCUMENTS

| 6,216,230 | B1 | 4/2001 | Rallis et al. | 713/185 |
|---|---|---|---|---|
| 6,484,259 | B1 | 11/2002 | Barlow | 713/159 |
| 7,178,724 | B2* | 2/2007 | Tamagno et al. | 235/380 |
| 7,200,756 | B2 | 4/2007 | Griffin et al. | |
| 7,269,258 | B2* | 9/2007 | Ishihara et al. | 380/263 |
| 7,424,622 | B2 | 9/2008 | Hashimoto et al. | |
| 7,434,069 | B2 | 10/2008 | Nessler | |
| 7,542,071 | B2* | 6/2009 | Yaegashi | 348/159 |
| 2003/0095659 | A1 | 5/2003 | Ishihara et al. | 380/46 |
| 2004/0196370 | A1* | 10/2004 | Yaegashi | 348/159 |
| 2004/0206812 | A1* | 10/2004 | Tamagno et al. | 235/380 |
| 2005/0015611 | A1* | 1/2005 | Poisner | 713/200 |
| 2005/0027997 | A1* | 2/2005 | Ueno et al. | 713/193 |
| 2005/0038998 | A1 | 2/2005 | Ueno et al. | 713/165 |
| 2005/0066161 | A1 | 3/2005 | Lin | 713/155 |
| 2005/0066199 | A1 | 3/2005 | Lin | 713/201 |
| 2005/0182934 | A1 | 8/2005 | Elteto | 713/169 |
| 2006/0029062 | A1* | 2/2006 | Rao et al. | 370/389 |
| 2006/0031674 | A1 | 2/2006 | Sakurai | |
| 2006/0041934 | A1 | 2/2006 | Hetzler | 726/9 |
| 2006/0117181 | A1 | 6/2006 | Brickell | 713/176 |
| 2006/0129797 | A1 | 6/2006 | Durfee et al. | 713/2 |

(Continued)

FOREIGN PATENT DOCUMENTS

JP 10-304206 A 11/1998
JP 2003-108442 A 4/2003

(Continued)

OTHER PUBLICATIONS

Dowdeswell, R.C. et al., "The CryptoGraphic Disk Driver", http://www.imrryr.org/~elric/cgd/cgd.pdf, 8 pages.

(Continued)

Primary Examiner — Bradley Holder
(74) Attorney, Agent, or Firm — Woodcock Washburn, LLP

(57) ABSTRACT

A Universal Serial Bus (USB) compatible storage device is utilized as a security token for storage of cryptographic keys. A cryptographic subsystem of a processor accesses cryptographic keys in containers on the USB compatible storage device. Accessing includes storing and/or retrieving. The processor does not include an infrastructure dedicated to the USB compatible storage device. Cryptographic key storage is redirected from an in-processor container to the USB compatible storage device. No password or PIN is required to access the cryptographic keys, yet enhanced security is provided. Utilizing a USB compatible storage device for a cryptographic key container provides a convenient, portable, mechanism for carrying the cryptographic key, and additional security is provided via physical possession of the device.

17 Claims, 3 Drawing Sheets

(56) References Cited

U.S. PATENT DOCUMENTS

| | | | |
|---|---|---|---|
| 2006/0130129 A1 | 6/2006 | Dai et al. | 726/9 |
| 2006/0287108 A1* | 12/2006 | Canterbury | 463/43 |
| 2007/0006290 A1* | 1/2007 | Li | 726/9 |

FOREIGN PATENT DOCUMENTS

| | | |
|---|---|---|
| JP | 2004-48742 A | 2/2004 |
| JP | 2005-504373 A | 2/2005 |
| JP | 2006-054876 A | 2/2006 |
| JP | 2006-155217 | 6/2006 |
| JP | 2006-163956 A | 6/2006 |
| JP | 2006-164096 A | 6/2006 |
| JP | 2006-227679 A | 8/2006 |
| JP | 2006-268513 A | 10/2006 |
| KR | 10-2006-0012826 A | 9/2006 |
| WO | WO 03/027816 | 4/2003 |
| WO | WO 2005/103912 | 11/2005 |

OTHER PUBLICATIONS

Komu, M. et al., "Applying a Cryptographic Namespace to Applications", *DIN*, 2005, http://www.cs.helsinki.fi/u/gurtov/papers/din05.pdf, 23-27.

Pritchard, J.R., "Detachable Data Compartmentalization: Layered Defense for Laptop Data Using USB Keychain Hard Drives as Detachable Data Compartmentalization Modules", Dec. 24, 2003, http://www.giac.org/certified_professionals/practicals/gsec/3566.php, 41 pages.

Seth, A. et al., "Practical Security for Disconnected Nodes", http://blizzard.cs.uwaterloo.ca/keshav/home/Papers/data/05/tca_security.dpf, 14 pages.

Office Action dated Oct. 21, 2009 from related CL application No. 182-2008.

PCT Search report received for PCT Application No. PCT/US2007/088597, mailed on Jul. 29, 2008.

\* cited by examiner

CRYPTOGRAPHIC KEY CONTAINERS ON A USB TOKEN

TECHNICAL FIELD

The technical field relates generally to computer processing and more specifically to computing security.

BACKGROUND

It is not uncommon to protect data via cryptography. Typically, cryptographic keys are used to encrypt and decrypt the data. Because the cryptographic keys provide means to protect the data and provide access to the protected data, the cryptographic keys also are protected. Unprotected cryptographic keys could open the door to various types of attacks, such as web site spoofing, impersonated authentications, and forged e-mails, for example.

One attempt to protect cryptographic keys is to store them on a smart card. A problem with this attempt however, is that smart cards require a dedicated infrastructure implemented on the processor with which the smart card will communicate. Typically, this infrastructure is implemented in the operating system of the processor, and thus can require considerable effort and time to implement. Also, smart cards require additional hardware in the form of a smart card reader, which can be bulky and expensive.

Another attempt to protect cryptographic keys is to store them within protected containers located on the processor. Typically, access to the keys is password protected. A problem with this attempt is that passwords protection is considered weak. An attacker gaining access to the processor could, via the use of a password cracker or the like, determine the password and gain access to the cryptographic keys stored in the container.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Keys are stored in a Universal Serial Bus (USB) compatible storage device. USB compatible storage devices do not require a dedicated infrastructure implemented in the operating system of the processor with which the USB compatible storage device will communicate. USB compatible storage devices do not required specialized readers. Key storage is redirected from an in-processor container to a USB compatible storage device. Thus, the USB compatible storage device is a security token for storing cryptographic keys. In an example embodiment, access to keys on the USB compatible storage device is accomplished via a secure execution environment. Access to keys on the USB compatible storage device does not necessarily require a password.

BRIEF DESCRIPTION OF THE DRAWINGS

The foregoing summary, as well as the following detailed description, is better understood when read in conjunction with the appended drawings. For the purpose of illustrating a cryptographic key container on a USB token, there is shown in the drawings exemplary constructions thereof; however, a cryptographic key container on a USB token is not limited to the specific methods and instrumentalities disclosed.

DETAILED DESCRIPTION OF ILLUSTRATIVE EMBODIMENTS

Cryptographic key containers are implemented on a Universal Serial Bus(USB) compatible storage device. The USB compatible storage device is utilized as a security token. A cryptographic subsystem of a processor, accesses (e.g., reads, writes, stores, retrieves) cryptographic keys in containers on the USB compatible storage device. No infrastructure dedicated to the USB compatible storage device is implemented on the processor accessing the cryptographic key on the USB compatible storage device. In an example embodiment, keys can be accessed without requiring a personal identification number (PIN), password, interactive authentication mechanism, or the like. Cryptographic key containers on USB compatible storage devices provide portability, thus providing a convenient mechanism for carrying the cryptographic key. Cryptographic key containers on USB compatible storage devices provide security via physical possession of the device. Accessing and processing cryptographic keys on a USB compatible storage device in a protected process provide run-time security.

Figure 1:
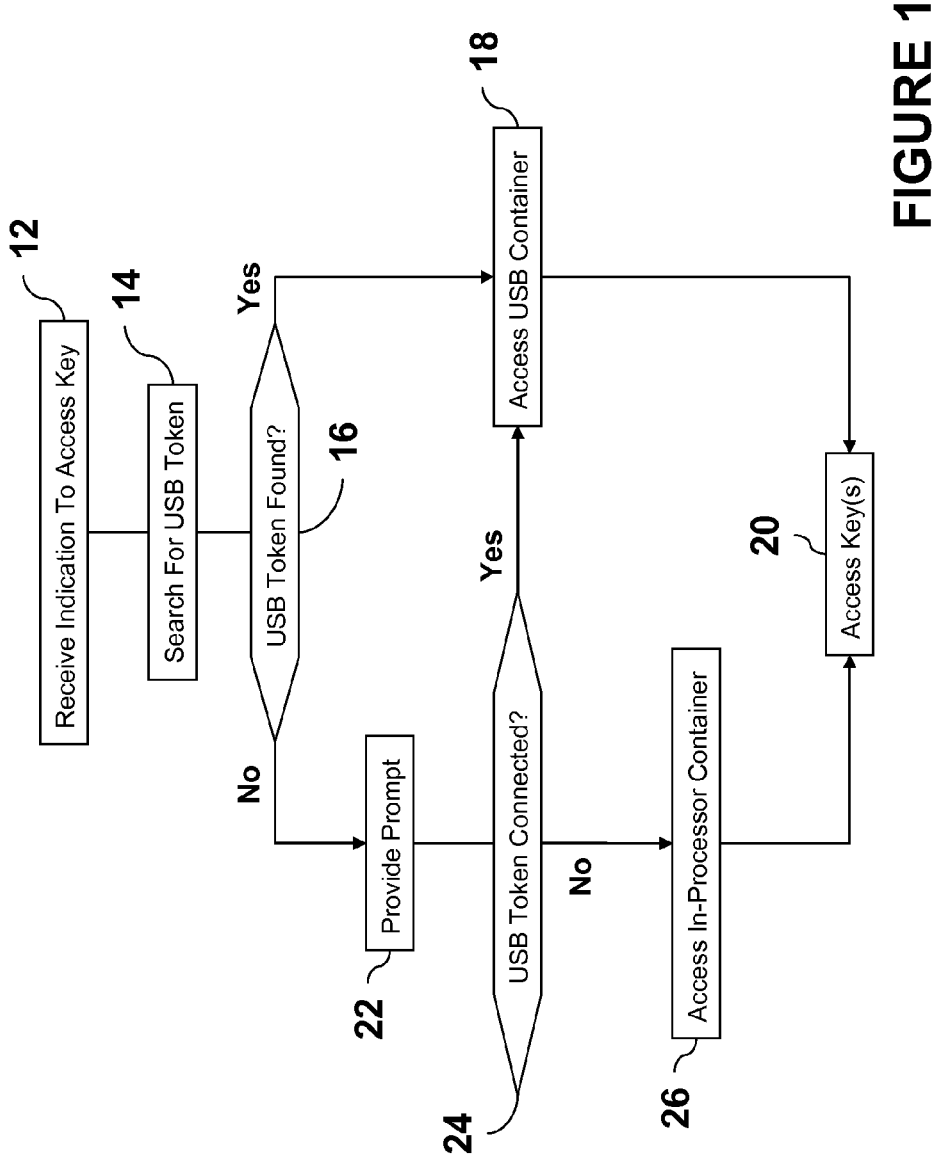
FIG. 1 is a flow diagram of an example process for accessing a cryptographic key container on a USB token.

FIG. 1 is a flow diagram of an example process for accessing a cryptographic key container on a USB token. At step 12, an indication to access a cryptographic key is received. In an example embodiment, the indication is received on a processor with which a user and/or developer is interacting. The indication could be a result of generating a cryptographic key, storing a cryptographic key, reading a cryptographic key, or a combination thereof. A USB token is searched for at step 14. That is, a search is conducted for a USB compatible storage device having a cryptographic key container stored thereon. If a USB token is found at step 16, the container stored thereon is accessed at step 18, and the cryptographic key (or keys) stored therein is accessed at step 20.

If no USB token is found at step 16, a prompt is provided at step 22. The prompt can be any appropriate prompt such as an indication to insert a USB device, or the like. A user/developer can respond to the prompt in various ways depending upon whether the user/developer prefers to utilize a cryptographic key container on a USB compatible storage device or to utilize a cryptographic key container stored in the processor. For example, if the user/developer prefers to utilize a cryptographic key container on a USB compatible storage device, the user/developer can insert a USB compatible storage device. The insertion will be detected by the processor. Alternatively, the user/developer could provide an indication to utilize an in-processor cryptographic key container rather than a cryptographic key container on a USB compatible storage device by depressing the "Enter" key on a keyboard, clicking a mouse, or the like.

At step 24, it is determined if a USB device has been coupled to the processor. If a USB compatible storage device has been coupled to the processor in response to the prompt to insert a USB device, the container stored thereon is accessed at step 18, and the cryptographic key (or keys) stored therein is accessed at step 20. If a USB compatible storage device has not been coupled to the processor, the in-processor container is accessed at step 26, and the cryptographic key (or keys) stored therein is accessed at step 20.

In an example configuration, the processor communicates with the USB compatible storage device via a cryptographic programming interface (e.g., WINDOWS® compatible cryptographic application programming interface—CAPI, VISTA® compatible cryptographic next generation—CNG). When the indication to access a cryptographic key is received (e.g., step 12) the cryptographic programming interface (e.g., CAPI, CNG) searches for the key by searching an index of USB compatible storage devices to search for the cryptographic key container. If the cryptographic key is not found on the container stored in the processor as part of the user/developer's profile for read or delete access, the cryptographic programming interface also will search paths on USB compatible storage devices coupled to the processor.

Default generation of a cryptographic key can utilize a cryptographic key container on a USB compatible storage device, or generation of cryptographic key can be user-specified. Accordingly, in an example embodiment, generation of a cryptographic key is based on a registry value. The registry value is indicative of how a key is to be generated. Thus, the cryptographic programming interface will generate a new cryptographic key only on a specified USB compatible storage device, only in the processor, or on a location specified by the user/developer, in accordance with the registry value. Any appropriate value can be used to indicate key generation method.

In an example embodiment, cryptographic keys are accessed within a protected execution environment. A protected execution environment basically isolates the cryptographic subsystem of the processor. The protected execution environment provides isolation between the cryptographic keys and the operating system. The protected execution environment also provides isolation between the cryptographic keys and applications executing on the processor. Thus, accessing cryptographic keys via the protected execution environment provides additional security by adding another layer of protection between the cryptographic keys and malicious software and/or attackers. In an example embodiment, the user application does not have access to the keys on the USB token directly, but rather sends cryptographic requests to a protected cryptographic process over a local RPC (Remote Process Call). The cryptographic process accesses the USB token for the requested operation by the user application (read, generate, use for a cryptographic operation such as signature generation, etc.) on behalf of the user application in the protected cryptographic process. No secret part of the cryptographic keys on the USB token is available outside the protected cryptographic process, thus isolating access to the secret cryptographic keys from user processes by restricting such accesses only to the protected cryptographic process. In an example configuration, in order to prevent undesired direct access to the USB token, the operating system to blocks user processes from accessing to the USB token.

Figure 2:
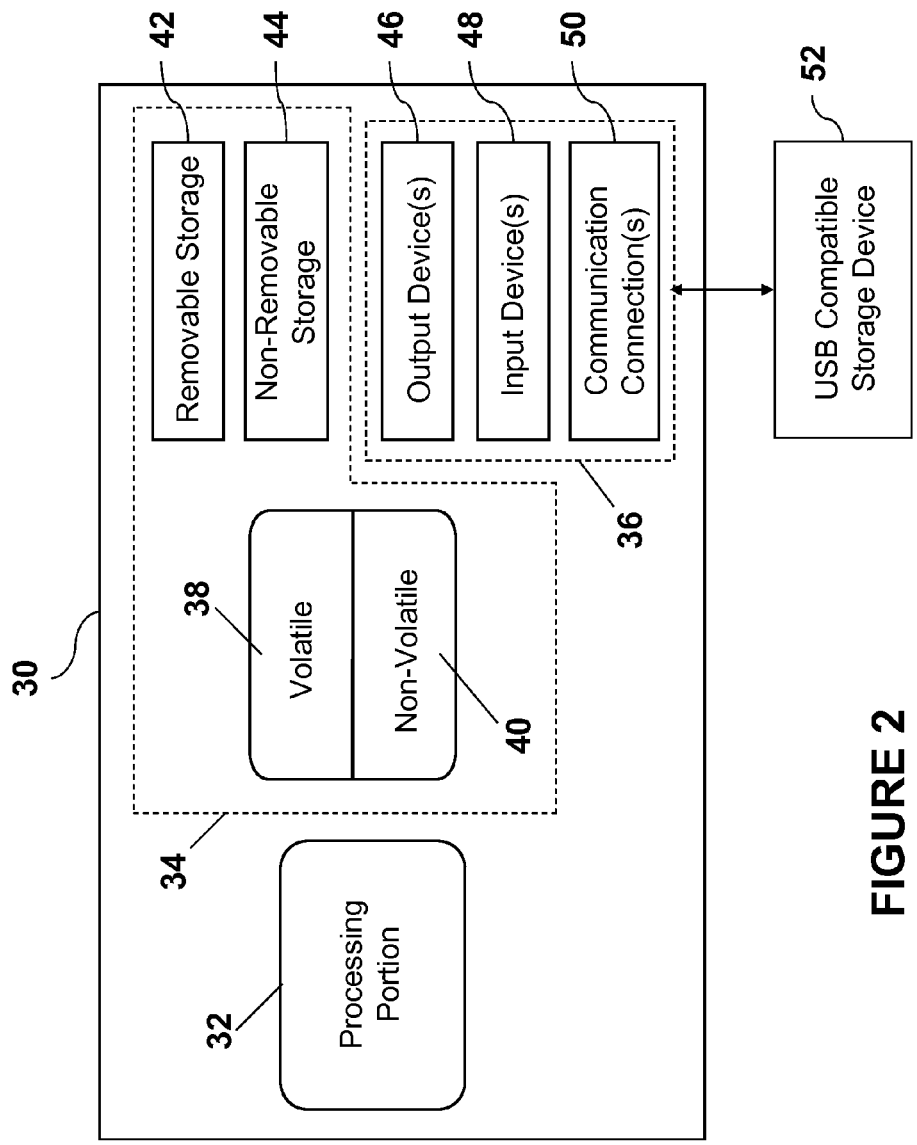
FIG. 2 is a diagram of an exemplary processor for implementing a cryptographic key container on a USB token.

FIG. 2 is a diagram of an exemplary processor 30 for implementing a cryptographic key container on a USB token on a USB compatible storage device 52. The processor 30 comprises a processing portion 32, a memory portion 34, and an input/output portion 36. The processor 30 comprises no infrastructure dedicated to the USB compatible storage device 52. The processing portion 32, memory portion 34, and input/output portion 36 are coupled together (coupling not shown in FIG. 2) to allow communications therebetween. The input/output portion 36 is capable of providing and/or receiving components utilized to implement a cryptographic key container on a USB token as described above. For example, the input/output portion 36 is capable of communicating with the USB compatible storage device 52. The input/output portion 36 is capable of receiving a cryptographic key from the USB compatible storage device 52, providing a cryptographic key to the USB compatible storage device 52, or a combination thereof.

The processor 30 is representative of any appropriate type of processor, or processor, that can be utilized with a USB compatible storage device 52. The processor 30 can represent a single processor or multiple processors. Multiple processors can be distributed or centrally located. The processor 30 can represent a portable device, or devices, such as, for example, a portable media player, e.g., a portable music player, such as an MP3 player, a walkmans, etc., a portable computing device, such as a laptop, a personal digital assistant ("PDA"), a portable phone, such as a cell phone of the like, a smart phone, a video phone, a portable email device, a thin client, a portable gaming device, etc., or a combination thereof.

The USB compatible storage device 52 is representative of type of the USB compatible storage device or devices. For example, the USB compatible storage device 52 can comprise a flash memory device, a disk storage device, a database, or a combination thereof. USB compatible storage devices can comprise various types of functionality. For example, a particular USB compatible storage device can only offer read-only support, and not allow generation (writing) of new keys and deletion of existing keys. In such a case, the cryptographic framework would only be able to read those keys and use them in cryptographic operations, but would not be able to alter the contents of the USB compatible storage device contents. In such a scenario, this type of USB compatible storage devices could be manufactured at factory and not modifiable thereafter.

The processing portion 32 is capable of implementing a cryptographic key container on a USB token as described above. For example, the processing portion 32 is capable of establishing a container on the USB compatible storage device 52 for storing cryptographic keys, searching for a USB token, receiving an indication to access a cryptographic key, providing a prompt, determining if a USB token is coupled to the processor 30, access keys stored on the USB compatible storage device 52, establishing a protected execution environment, maintaining a protected execution environment, or a combination thereof.

The processor 30 can be implemented as a client processor and/or a server processor. In a basic configuration, the processor 30 can include at least one processing portion 32 and memory portion 34. The memory portion 34 can store any information utilized in conjunction with a cryptographic key container on a USB token, such as a cryptographic key and/or a cryptographic hash of a cryptographic key, for example. Depending upon the exact configuration and type of processor, the memory portion 34 can be volatile (such as RAM) 38, non-volatile (such as ROM, flash memory, etc.) 40, or a combination thereof. The processor 30 can have additional features/functionality. For example, the processor 30 can include additional storage (removable storage 42 and/or non-removable storage 44) including, but not limited to, magnetic or optical disks, tape, flash, smart cards or a combination thereof. Computer storage media, such as memory portion 34, 38, 40, 42, and 44, include volatile and nonvolatile, removable and non-removable media implemented in any method or technology for storage of information such as computer readable instructions, data structures, program modules, or other data. Computer storage media include, but are not limited to, Random Access Memory (RAM), Read Only Memory (ROM), Electrically Erasable Programmable Read Only Memory (EEPROM), flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 30. Any such computer storage media can be part of the processor 30.

The processor 30 can also contain communications connection(s) 50 that allow the processor 30 to communicate with other devices. Communications connection(s) 50 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 30 also can have input device(s) 48 such as keyboard, mouse, pen, voice input device, touch input device, etc. Output device(s) 46 such as a display, speakers, printer, etc. also can be included.

Figure 3:
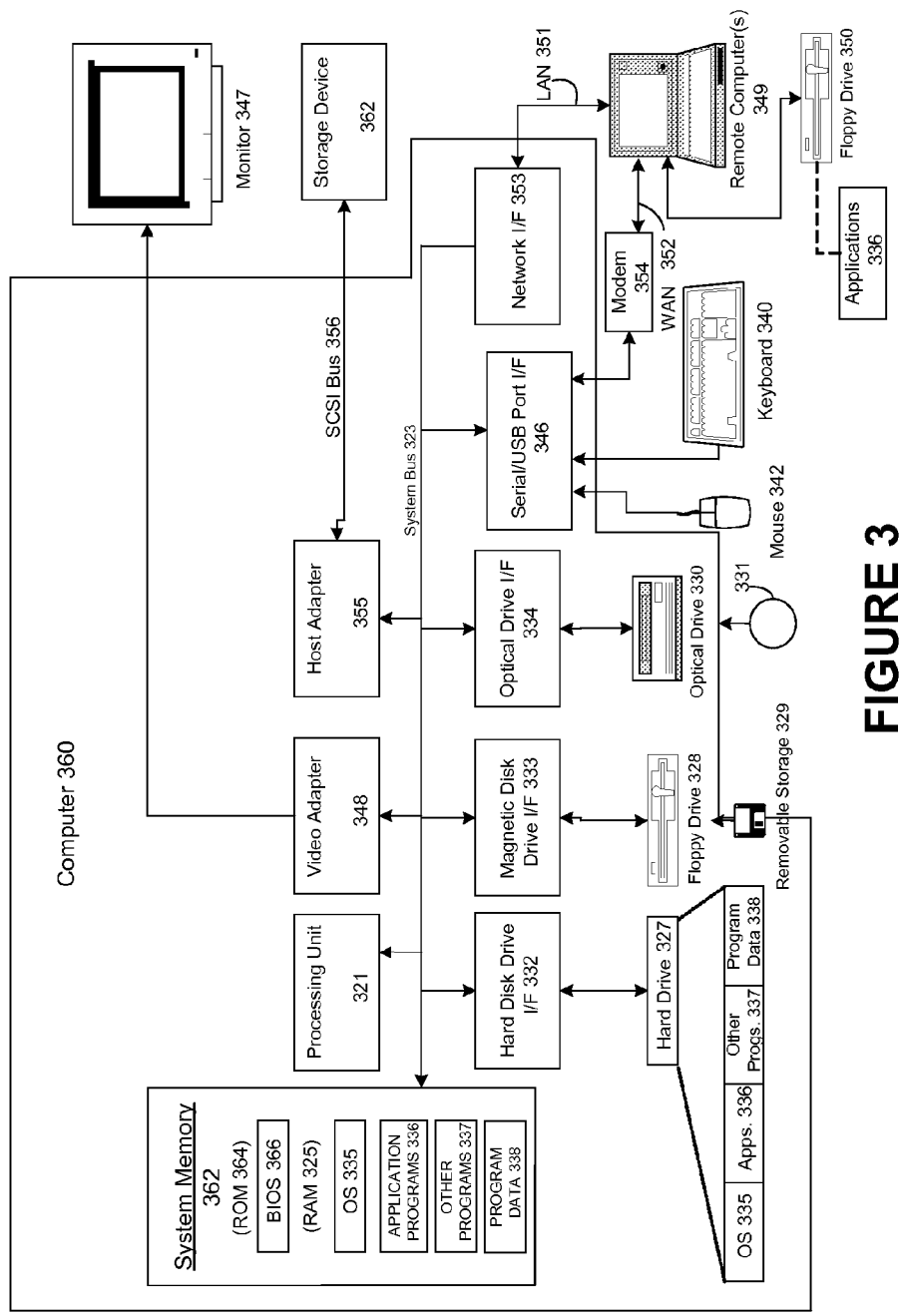
FIG. 3 is a depiction of a suitable computing environment in which providing a cryptographic key container on a USB token can be implemented.

FIG. 3 and the following discussion provide a brief general description of a suitable computing environment in which a cryptographic key container on a USB token can be implemented. Although not required, various aspects of a cryptographic key container on a USB token can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of multi-threaded detection of a game software debugger can be practiced with other computer system configurations, including hand held devices, multi processor systems, microprocessor based or programmable consumer electronics, network PCs, minicomputers, mainframe computers, and the like. Further, multi-threaded detection of a game software debugger also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 321, the memory (both ROM 364 and RAM 325), the basic input/output system (BIOS) 366, and various input/output (I/O) devices such as a keyboard 340, a mouse 342, a monitor 347, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with a cryptographic key container on a USB token as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 3, an exemplary general purpose computing system includes a conventional computing device 360 or the like, including a processing unit 321, a system memory 362, and a system bus 323 that couples various system components including the system memory to the processing unit 321. The system bus 323 may be any of several types of bus structures including a memory bus or memory controller, a peripheral bus, and a local bus using any of a variety of bus architectures. The system memory includes read only memory (ROM) 364 and random access memory (RAM) 325. A basic input/output system 366 (BIOS), containing basic routines that help to transfer information between elements within the computing device 360, such as during start up, is stored in ROM 364. The computing device 360 may further include a hard disk drive 327 for reading from and writing to a hard disk (hard disk not shown), a magnetic disk drive 328 (e.g., floppy drive) for reading from or writing to a removable magnetic disk 329 (e.g., floppy disk, removal storage), and an optical disk drive 330 for reading from or writing to a removable optical disk 331 such as a CD ROM or other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer readable media provide non volatile storage of computer readable instructions, data structures, program modules and other data for the computing device 360. Although the exemplary environment described herein employs a hard disk, a removable magnetic disk 329, and a removable optical disk 331, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 329, optical disk 331, ROM 364, or RAM 325, including an operating system 335, one or more application programs 336, other program modules 337, and program data 338. A user may enter commands and information into the computing device 360 through input devices such as a keyboard 340 and pointing device 342 (e.g., mouse). Other input devices (not shown) may include a microphone, joystick, game pad, satellite disk, scanner, or the like. These and other input devices are often connected to the processing unit 321 through a serial port interface 346 that is coupled to the system bus, but may be connected by other interfaces, such as a parallel port, game port, or universal serial bus (USB). A monitor 347 or other type of display device is also connected to the system bus 323 via an interface, such as a video adapter 348. In addition to the monitor 347, computing devices typically include other peripheral output devices (not shown), such as speakers and printers. The exemplary environment of FIG. 3 also includes a host adapter 355, Small Computer System Interface (SCSI) bus 356, and an external storage device 362 connected to the SCSI bus 356.

The computing device 360 may operate in a networked environment using logical connections to one or more remote computers, such as a remote computer 349. The remote computer 349 may be another computing device (e.g., personal computer), a server, a router, a network PC, a peer device, or other common network node, and typically includes many or all of the elements described above relative to the computing device 360, although only a memory storage device 350 (floppy drive) has been illustrated in FIG. 3. The logical connections depicted in FIG. 3 include a local area network (LAN) 351 and a wide area network (WAN) 352. Such networking environments are commonplace in offices, enterprise wide computer networks, intranets and the Internet.

When used in a LAN networking environment, the computing device 360 is connected to the LAN 351 through a network interface or adapter 353. When used in a WAN networking environment, the computing device 360 can include a modem 354 or other means for establishing communications over the wide area network 352, such as the Internet. The modem 354, which may be internal or external, is connected to the system bus 323 via the serial port interface 346. In a networked environment, program modules depicted relative to the computing device 360, or portions thereof, may be stored in the remote memory storage device. It will be appreciated that the network connections shown are exemplary and other means of establishing a communications link between the computers may be used.

While it is envisioned that numerous embodiments of a cryptographic key container on a USB token are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing a cryptographic key container on a USB token, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a cryptographic key container on a USB token.

The program(s) can be implemented in assembly or machine language, if desired. In any case, the language can be a compiled or interpreted language, and combined with hardware implementations. The methods and apparatuses for implementing a cryptographic key container on a USB token also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of a cryptographic key container on a USB token. Additionally, any storage techniques used in connection with a cryptographic key container on a USB token can invariably be a combination of hardware and software.

While a cryptographic key container on a USB token has been described in connection with the example embodiments of the various figures, it is to be understood that other similar embodiments can be used or modifications and additions can be made to the described embodiments for performing the same functions of a cryptographic key container on a USB token without deviating therefrom. Therefore, a cryptographic key container on a USB token as described herein should not be limited to any single embodiment, but rather should be construed in breadth and scope in accordance with the appended claims.

What is claimed:

1. A method comprising:
receiving, in a computer system comprising a processor, a request to access a cryptographic key;
the processor communicating with an application programming interface to automatically conduct a search, without requiring user interaction, for a USB compatible storage device having a first cryptographic key stored thereon in a key container, the searching comprising the processor searching an index of USB compatible storage devices to search for the key container;
if the USB compatible storage device is found, fetching, via a protected cryptographic process, the first cryptographic key from the USB compatible storage device, the protected cryptographic process preventing any user application executed by an operating system on the computer system, from directly accessing the cryptographic key; and
if the USB compatible storage device is not found:
rendering a prompt to provide the USB compatible storage device;
determining if the USB compatible storage device has been provided;
if the USB compatible storage device has been provided, accessing the first cryptographic key on the USB compatible storage device via the protected cryptographic process which prevents any user application executed by an operating system on the computer system from directly accessing the cryptographic key; and
if the USB compatible storage device has not been provided, accessing a second cryptographic key stored in a memory of the computer system.

2. A method in accordance with claim 1, further comprising:
storing the second cryptographic key in the memory of the computer system.

3. A method in accordance with claim 1, wherein after fetching, the first cryptographic key is isolated in a protected execution environment of the computer system.

4. A method in accordance with claim 1, wherein the first cryptographic key is fetched by the cryptographic process via a cryptographic programming interface.

5. A method in accordance with claim 1, wherein the USB compatible storage device is a read-only device.

6. A method in accordance with claim 1, further comprising:
generating a new cryptographic key based on a registry value, wherein the registry value is indicative of how the new cryptographic key is to be generated.

7. A method in accordance with claim 6, wherein the registry value is indicative of:
generation of the new cryptographic key only on a specified USB compatible storage device or generation of the new cryptographic key only on the computer system.

8. A method in accordance with claim 1, the searching further comprising searching paths on USB compatible storage devices coupled to the processor.

9. A computer system comprising:
a processor; and
memory coupled to the processor, the memory comprising executable instructions that when executed by the processor cause the processor to effectuate operations comprising:
receiving a request to access a cryptographic key;
searching, via an application programming interface to automatically search, without requiring user interaction, for a USB compatible storage device having a first cryptographic key stored thereon in a key container, the searching comprising searching an index of USB compatible storage devices to search for the key container; and
if the USB compatible storage device is found, fetching, via a protected cryptographic process, the first cryptographic key on the USB compatible storage device, the protected cryptographic process preventing any user application executed by an operating system on the computer system, from directly accessing the cryptographic key; and
if the USB compatible storage device is not found:
rendering a prompt to provide the USB compatible storage device;
determining if the USB compatible storage device has been provided;
if the USB compatible storage device has been provided, accessing the first cryptographic key on the USB compatible storage device via the protected cryptographic process which prevents any user application executed by an operating system on the computer system from directly accessing the cryptographic key; and
if the USB compatible storage device has not been provided, accessing a second cryptographic key stored in a memory of the computer system.

10. A system in accordance with claim 9, the operations further comprising:
storing the second cryptographic key in the memory of the computer system.

11. A system in accordance with claim 9, wherein after accessing, the first cryptographic key is isolated in a protected execution environment of the system.

12. A system in accordance with claim 9, wherein the USB compatible storage device comprises a portable device.

13. A computer-readable storage medium that is not a transient signal, the computer-readable storage medium having stored thereon computer-executable instructions that when executed by a processor cause the processor to effectuate operations comprising:
receiving, in a computer system, a request to access a cryptographic key;
searching, via an application programming interface to automatically search, without requiring user interaction, for a USB compatible storage device having a first cryptographic key stored thereon in a key container, the searching comprising searching an index of USB compatible storage devices to search for the key container; and
if the USB compatible storage device is found, fetching via a protected cryptographic process, the first cryptographic key from the USB compatible storage device, the protected cryptographic process preventing any user application executed by an operating system on the computer system, from directly accessing the cryptographic key; and
if the USB compatible storage device is not found:
rendering a prompt to provide the USB compatible storage device;
determining if the USB compatible storage device has been provided;
if the USB compatible storage device has been provided, accessing the first cryptographic key on the USB compatible storage device via the protected cryptographic process which prevents any user application executed by an operating system on the computer system from directly accessing the cryptographic key; and if the USB compatible storage device has not been provided, accessing a second cryptographic key stored in a memory of the computer system.

14. A computer-readable storage medium in accordance with claim 13, the operations further comprising accessing the first cryptographic key via a cryptographic programming interface.

15. A computer-readable storage medium in accordance with claim 13, the operations further comprising:

storing the second cryptographic key in the memory of the computer system.

16. A computer-readable storage medium in accordance with claim 13, wherein after fetching, the first cryptographic key is isolated in a protected execution environment of the computer system.

17. A computer-readable storage medium in accordance with claim 13, wherein the USB compatible storage device comprises a portable device.

* * * * *